Oct. 9, 1956

B. A. RUNDE 2,765,980

CALCULATING MACHINE RECORD FORM HANDLING MECHANISM

Filed Sept. 2, 1953

INVENTOR.
BYRON A. RUNDE
BY Fidler, Crouse
& Beardsley
ATTORNEYS

Fig. 2.

Oct. 9, 1956   B. A. RUNDE   2,765,980
CALCULATING MACHINE RECORD FORM HANDLING MECHANISM
Filed Sept. 2, 1953   8 Sheets-Sheet 3

Fig. 3.

INVENTOR
BYRON A. RUNDE
BY Fidler, Crouse
+ Beardsley
ATTORNEYS

Oct. 9, 1956  B. A. RUNDE  2,765,980
CALCULATING MACHINE RECORD FORM HANDLING MECHANISM
Filed Sept. 2, 1953  8 Sheets-Sheet 5

Fig. 5.

INVENTOR.
BYRON A. RUNDE
BY Fidler, Crouse
& Beardsley,
ATTORNEYS

Oct. 9, 1956 B. A. RUNDE 2,765,980
CALCULATING MACHINE RECORD FORM HANDLING MECHANISM
Filed Sept. 2, 1953 8 Sheets-Sheet 8

Fig. 9.

| | | PICK-UP | PURCHASES | | RETURN | PAYMENTS | NEW BALANCE | | |
|---|---|---|---|---|---|---|---|---|---|---|
| | | 1 | 2 | 3 | 4 | 5 | 6 | | |
| A | | 100.00 | 10.00<br>6.00 | 10.00 | 6.00 | 75.00 | FEB 5 | 45.00S | |
| B | | ADD | ADD 2 | ADD | SUBT | SUBT | SUB TOTAL | | |
| | | ADD 1 | ADD 2 | ADD 2 | ADD 3 | ADD 4 | NA 1 | | |
| C | | NA 1 | | | | ADD 4 | NA 1 | | |
| | | | | | | | CARRIAGE "OPEN" | | |

STATEMENT — 3360

| | HISTORY | | | LEDGER | | |
|---|---|---|---|---|---|---|
| | BAL | PUR | RET | PAY | PAST-DUE | |
| | 7 | 8 | 9 | 10 | 11 | |
| JAN | 100.00 | | | | | |
| FEB | 45.00 | 26.00 | 6.00 | 75.00 | 19.00* | |
| | S.T. | SUBT | NA | NA | TOT | |
| | NA 1 | NA 2 | NA 3 | NA 4 | NA 2 | |
| | ADD 1 | TOT 2 | TOT 3 | TOT 4 | NA 2 | |
| | | | | CARRIAGE "OPEN" | | |

HISTORY LEDGER — 3361

INVENTOR.
BYRON A. RUNDE
BY Fidler, Crome
& Beardsley
ATTORNEYS

United States Patent Office 2,765,980
Patented Oct. 9, 1956

2,765,980

CALCULATING MACHINE RECORD FORM HANDLING MECHANISM

Byron A. Runde, Farmington, Mich., assignor to Burroughs Corporation, Detroit, Mich., a corporation of Michigan Application September 2, 1953, Serial No. 378,085

14 Claims. (Cl. 235—60.51)

The present invention relates to improvements in accounting machines and more particularly to a novel means to give warning to the operator of the machine whenever an amount, such as an overdue balance or the like, printed in a selected operation of the machine, has a particular quality, as when, for example, it is in excess of a predetermined figure.

The invention is especially useful in connection with certain kinds of accounting work such as, for example, department store charge accounts cycle billing, in which it is a desirable practice to send special communications, notices or reminders to charge customers in whose accounts there are, on the respective billing dates, "overdue" unpaid charges totaling more than a certain amount. The notices or reminders conveniently may be printed forms and may be of a plurality of kinds related to the age and amounts of past due items but picking out the statements of account to which such communications are to be attached requires both attention and time.

An object of the present invention is to provide an improved means for drawing the attention of the operator of the machine by which statements of account or other accounting or computing records are produced to those statements or records which require special attention in consequence of the recording in a predetermined operation of the machine, i. e., in a certain position on the record form, of an amount of a predetermined character, for the purpose of reducing to a minimum the demand upon the time and attention of the operator and correspondingly increasing the work output.

Computing or accounting records of the nature referred to above are advantageously prepared on an accounting machine having a paper carriage comprising elements, such as a platen and paper guiding and holding devices which are automatically movable, after the machine has printed in a predetermined position on the record form, from printing or closed position to open position to facilitate the removal and replacement of record forms. The automatic carriage opening controls of such machines may be arranged to cause the automatic opening of the carriage to be effected when, after the completion of one or a series of computations, the result has been printed in an appropriate column of the record, for example, after the printing of a total in a "Past Due" column of a ledger sheet, at which time the completed record should be removed and new record forms should be inserted in the carriage.

The present invention is hereinafter disclosed as embodied in a machine of the kind disclosed in Patent No. 2,629,549, with certain improvements disclosed in applications Serial No. 242,623 filed August 20, 1951 by Byron A. Runde and Serial No. 258,134, now Patent No. 2,721,695 filed November 26, 1951 by Thomas M. Butler. In the present machine, the automatic function control means of the machine is set up for a cycle billing, original statement and ledger program in which automatic opening of the paper carriage normally occurs after the printing of a total in a "Past Due" column at the right-hand side of a ledger sheet, and in which the present invention is so applied that whenever the total so printed exceeds a predetermined amount, means controlled by the type carriers of the printing mechanism suppresses the automatic opening of the carriage normally occurring at that time so that the operator, before removing the completed record from the machine and inserting new forms, is required to touch a carriage opening key to open the carriage and is thereby notified that the completed statement shows a "Past Due" total of such amount that special treatment of the statement, such as the attaching of a printed notice, is required. Thus, the machine operator may perform the posting work rapidly without need to give any attention to "Past Due" amounts except when, upon completion of a statement and ledger for any individual account, the paper carriage does not open automatically. However, the operator's special attention to each such statement requiring special handling is enforced without burdening the operator with any extra effort beyond merely depressing the carriage opening key.

The above mentioned and other features, advantages and applications of the invention will become apparent from the following detailed description of the preferred embodiment thereof illustrated in the accompanying drawings in which.

The invention is illustrated in the accompanying drawings and described in detail hereinafter as embodied in a Burroughs accounting machine of the kind shown in the Thomas M. Butler Patent No. 2,629,549 issued February 24, 1953 (hereinafter referred to simply as "the Butler patent"), with certain additions and modifications disclosed in co-pending applications specifically mentioned hereinafter. It is, however, to be understood that the present invention may be embodied in various forms in other accounting machines or the like. Portions of the machine disclosed in the Butler patent or in the above mentioned applications and which are also shown in the accompanying drawings and referred to hereinafter are identified by the same reference numbers by which they have been designated in such patent and applications. More specifically, elements and devices disclosed in the Butler Patent No. 2,629,549 are designated by reference numbers below 2600, those disclosed in the Runde application Serial No. 242,623 are designated by reference numbers between 2800 and 3000, and those disclosed in the Butler and Runde application Serial No. 258,134 are designated by reference numerals between 3000 and 3300. Elements and devices newly disclosed in the present application are designated by reference numerals above 3300.

Consistently with the description in the Butler patent, the terms clockwise and counterclockwise will be employed to describe rotary or swinging movements as viewed from above, in front of, or from the right hand side of the machine and the terms rightward, leftward, forward, rearward, upward and downward will be employed to describe motions and positions as viewed normally from in front of the machine.

Figure 8:
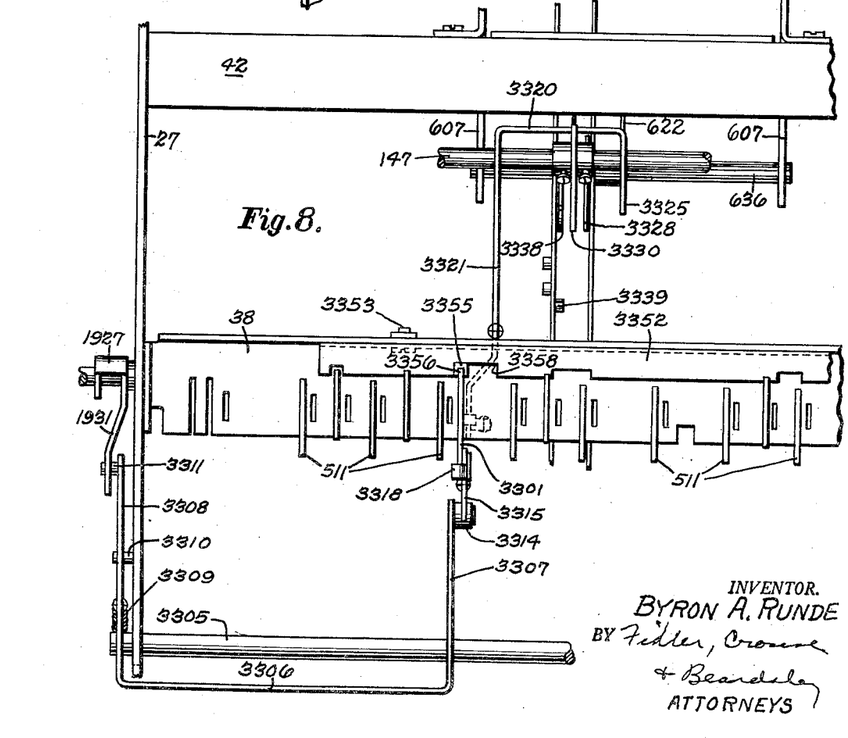
Fig. 8 is a rear elevation of a portion of the control means of Fig. 5.

The machine has a main shaft 126 (Figs. 1 and 2) which is driven through one full revolution in each cycle of operation of the machine by an electric motor and cycling clutch (not shown) as disclosed in detail in said Butler patent. The keyboard has a plurality of rows of amount keys 255, a row of motor bars 291, 292, 293 and 294, and rows of date and designation keys (not shown) as disclosed in the Butler patent, and function control keys referred to again hereinafter. The amount differential mechanism includes for each row of amount keys an amount actuator rack slide 511 (Figs. 2 and 8) capable of being reciprocated forwardly and back in each machine cycle by a bail rod 531 reciprocated by links 540 and levers 541 actuated by pairs of cams 545 and 546 secured on the shaft 126. At the left of the series of amount actuators 511 is a further amount actuator rack slide 519 similarly reciprocable by the bail 531.

The illustrated machine has three computing units designated A, B and C, respectively, with reference to the positions in which they are located in the machine. The front or A unit is the front crossfooter of the machine of the Butler patent and cooperates with the actuators 511 and 519 in performing addition and subtraction and in the taking of positive and true negative totals as disclosed in detail in said Butler patent. The B and C or middle and rear units, respectively, are each a multiple register unit like that disclosed in the co-pending application Serial No. 242,623 of Byron A. Runde, filed August 20, 1951 (referred to hereinafter simply as "the Runde application"), and each contains four registers any one of which may be selected for cooperation with the actuators 511 and 519 for performing computing functions. In amount entering cycles, the excursions of the actuators 511 from their normal "0" positions are limited by stop sectors 491 which cooperate with lugs 510 on said actuators and are controlled by stop slides 483, the rearward movements of which are limited by depressed keys 255 in the respective amount key rows, the highest order actuator 519, for which there is no row of amount keys or stop slide 483, being held against movement from its normal position by lug 521 engaging a stud 520 in the forward end of the actuator. In total-taking cycles, the stop slides 483 and thus also the stop sectors 491 are held in their normal ineffective positions by a bail member 968 and the lug 521, being carried by said bail member, is withdrawn from the stud 520, and the excursions of the actuators 511 and 519 are limited, by the pinions of the crossfooter or register from which a total is being taken, to the extent, if any, required to return those pinions to "0." At the left of the highest order amount actuator 519 are further actuators also reciprocable by the bail rod 531 to extents controlled by similar stop sectors and stop slides which are in turn controlled by date and designation keys, all as disclosed in the Butler patent but not shown herein.

Each of the amount, date and designation actuators is geared through a rack slide 523 thereon and an individual gear train to a respective one of a series of amount date and designation type carriers 562 whereby the amount type carriers are indexed in each machine cycle in accordance with the amount entered on the keys 255 or the total taken from the crossfooter or from one of the registers, and the date and designation type carriers are indexed in accordance with the depressed date and designation keys. When the type carriers 562 have been indexed, the types 561 at the printing line may be driven by printing hammers 605 against a paper held against a platen roll 1057 supported on a traveling paper carriage 1056 supported on the machine frame for columnwise movements in tabulating and return directions by power driven tabulating and return mechanism like that disclosed in the Butler patent.

Figure 1:
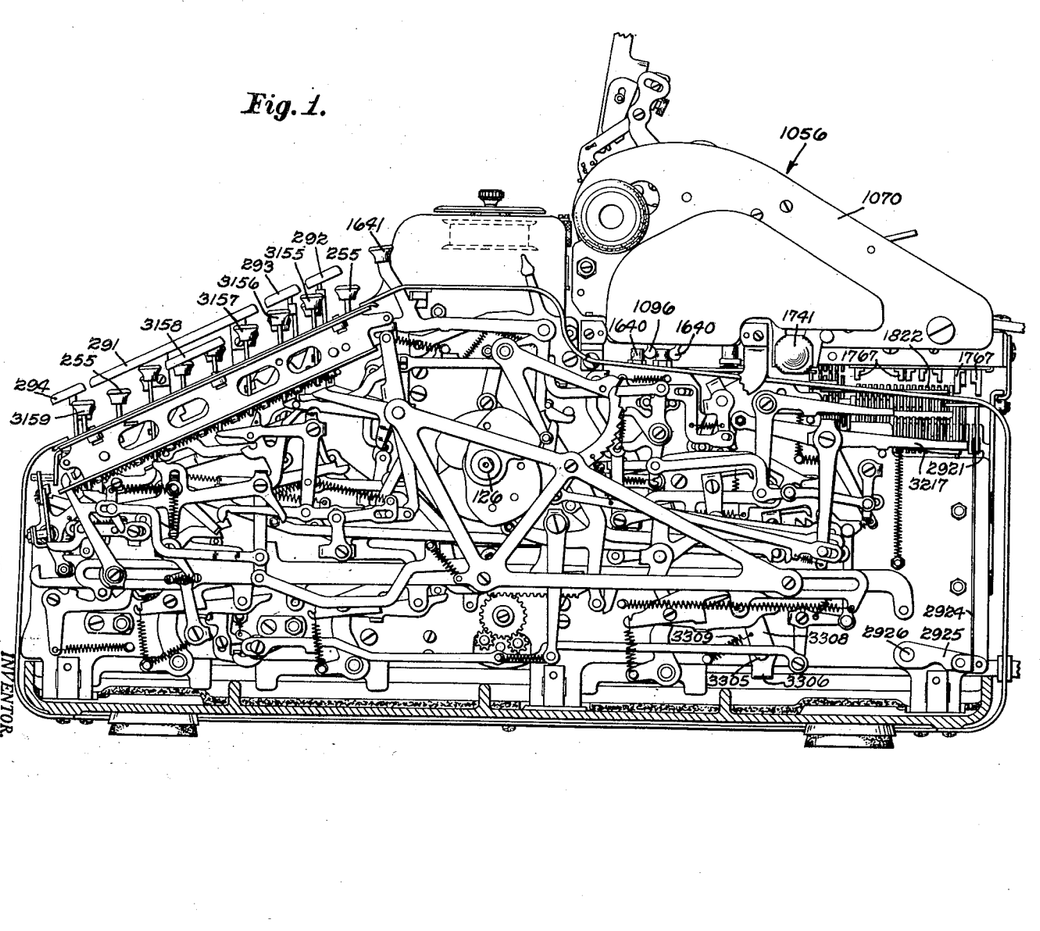
Fig. 1 is a right side elevation of a machine embodying the present invention with the right side of the machine case removed, the base pan being shown in section.
Figure 5:
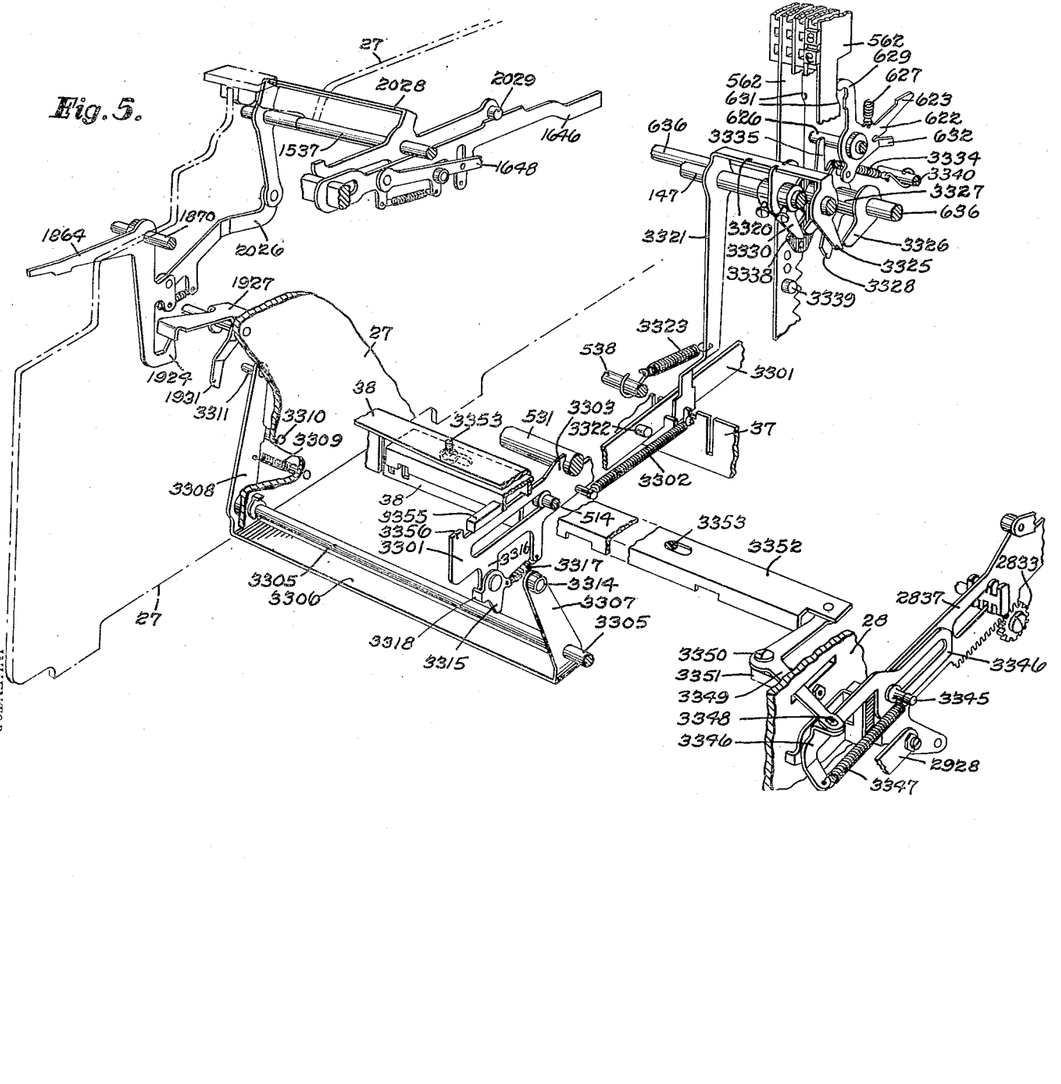
Fig. 5 is a perspective, as seen from rearwardly, leftwardly and above, of carriage opening control elements of the present invention.

The machine is provided with manual and automatic function control means which are like those disclosed in detail in the Butler patent with the modifications and additions disclosed in the Runde application including the lane 25 carriage controlled register selecting means, a portion of which is shown in Fig. 5. More specifically, during cycles of machine operation, control projections 1767 in lane 25 of the program control unit 1731 control the rise of a sensing pin 2920 (Fig. 2) which in turn controls the rocking of a control lever 2921 (Fig. 1). The control lever 2921 effects the lifting of a link 2924 which through a lever 2925, shaft 2926, a lever (not shown herein but numbered 2927 in the Runde application) and a link 2928 (Fig. 5) operates a rack slide 2837 which through pinions 2833 shift the multiple register assemblies laterally with respect to the amount differential actuator racks 511 to select predetermined ones of the registers of both multiple register units during the same machine cycle. As the registers of both of the multiple register units are selected by the operation of the same rack slide 2837, corresponding registers in both multiple register units will be placed in operative alignment with the actuator racks 511, 512 in the same machine cycle. The slide 2837 is normally positioned to place the No. 1 register of each multiple register assembly in active position. At the end of any machine cycle in which the slide 2837 is operated to place any other of the registers of each of the multiple register units in operative position, the slide 2837 and the multiple register assemblies are again returned to the normal No. 1 register position.

As in the machine of said Runde application, selection of the individual register of the multiple register units is effected solely by the above outlined lane 25 automatic register selecting means. No key-controlled register selecting means is provided.

The computing functions of any selected register of the B register unit are controlled manually and automatically by the register function controls disclosed in the above mentioned Runde application, whereas the functions of the selected register of the C multiple register unit are selected by the manual and automatic register function controls disclosed in the above mentioned Butler and Runde application.

Figure 6:
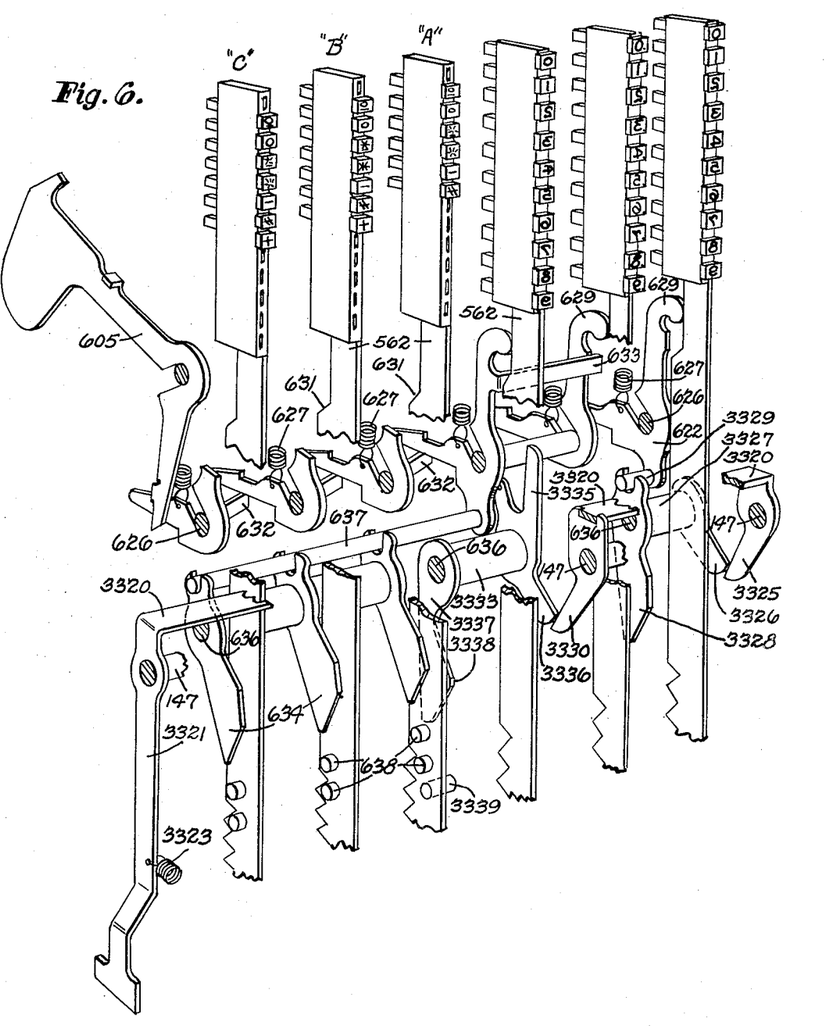
Fig. 6 is a spread perspective, as seen from rearwardly, rightwardly and above, of portions of some of the printing type bars and of carriage opening control elements associated therewith.

The computing functions performed by the front crossfooter are designated on the record produced by the machine by a function identifying symbol printed by selected types carried by a type bar 562 designated "A" in Fig. 6 and therein shown next leftwardly of the pennies order amount type bar 562 (rightwardly of the pennies order type bar, as viewed from the front of the machine). The functions of the selected registers of the B and C multiple register units are likewise indicated on the records produced on the machine by symbols printed by the symbol type bars designated "B" and "C" in Fig. 6, each of the symbol printing type bars being indexed to the proper symbol printing position by indexing mechanisms like those disclosed in the above mentioned prior patents and applications.

The printing mechanism of the machine is in other respects like that disclosed in the above mentioned Butler patent.

Figure 2:
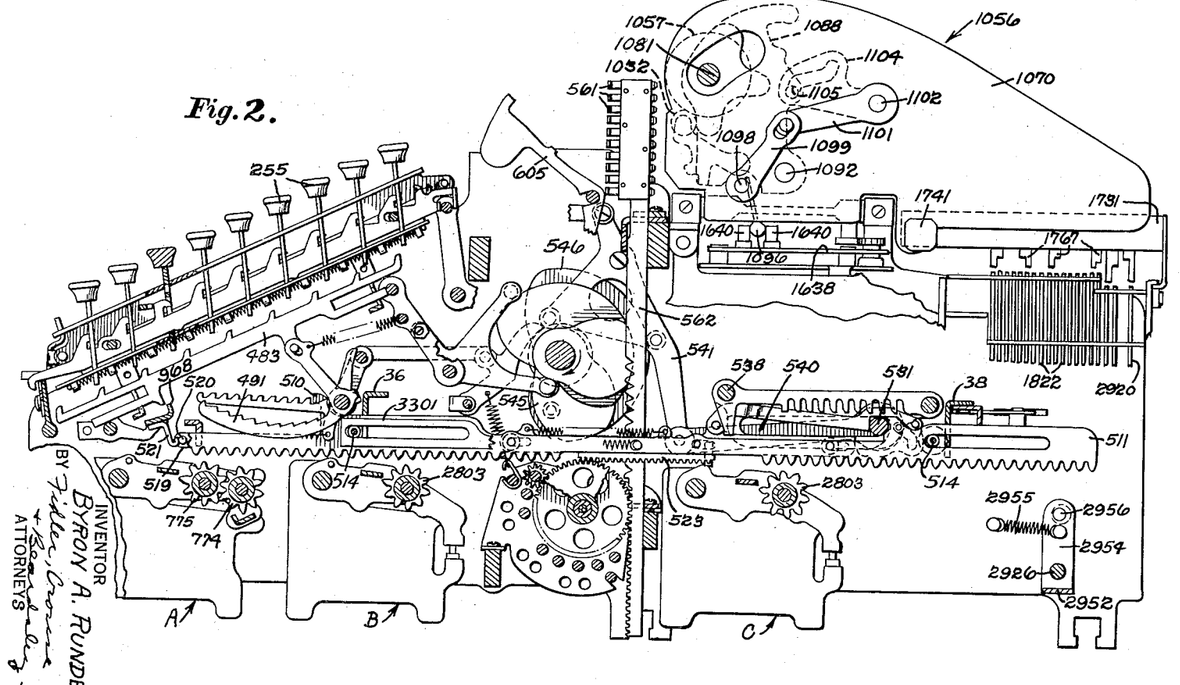
Fig. 2 is a fore and aft vertical section through the machine of Fig. 1 with many elements omitted to reveal more clearly the remaining elements.

The machine, as already mentioned, has a traveling paper carriage 1056 like that disclosed in the Butler patent, comprising a frame which includes side plates 1070 and is adapted to travel in tabulating and return directions to predetermined columnar positions, all as disclosed in detail in the said Butler patent. The shaft 1081 of the rotatable platen roller 1057 (Fig. 2) is supported in a frame comprising side members 1088 and in turn supported on a shaft 1092 rotatably mounted at its ends in the carriage side plates 1070. The platen is shown in Fig. 2 as being in its normal printing or closed carriage position, but it may be rocked backwardly and upwardly to a front feed or open carriage position by rocking frame members 1088 and shaft 1092 clockwise. For this purpose, each of the platen frame plates 1088 carries a roller stud 1105 engaged in the cam slot of a respective one of two cam arms 1104 secured on shafts 1102 suitably journaled in respective side plates 1070. Each shaft 1102 also has secured to its outer end an arm 1101 having a stud and slot connection with arms 1099 secured on opposite ends of a shaft 1098 journaled in the carriage side plates 1070. Shaft 1098 has secured thereto a bail member 1096 (see also Fig. 3), the thickened and rounded lower edge portion of which is embraced between a pair of roller studs 1640 carried on slide 1638 mounted for backward and forward movement on a stationary portion of the machine frame.

It will be noted that forward movement of slide 1638 will rock the bail member 1096, shaft 1098 and arms 1099 clockwise, causing the arms 1101, shaft 1102 and cam arms 1104 to rock counterclockwise and through the roller studs 1105 to rock the platen frame, including the side plates 1088 and the platen 1057 carried thereby, upwardly and rearwardly away from printing position. During such movement, paper guide and holding devices, as disclosed in the Butler patent, and including the pressure rolls indicated generally in Fig. 2, are separated from the platen to permit easy insertion of new record forms in the carriage about the platen. Upon the return movement of the slide 1638 rearwardly to its normal position, the above described parts are moved reversely to reengage the paper holding devices with the platen and return the platen forwardly and downwardly to printing position.

Figure 3:
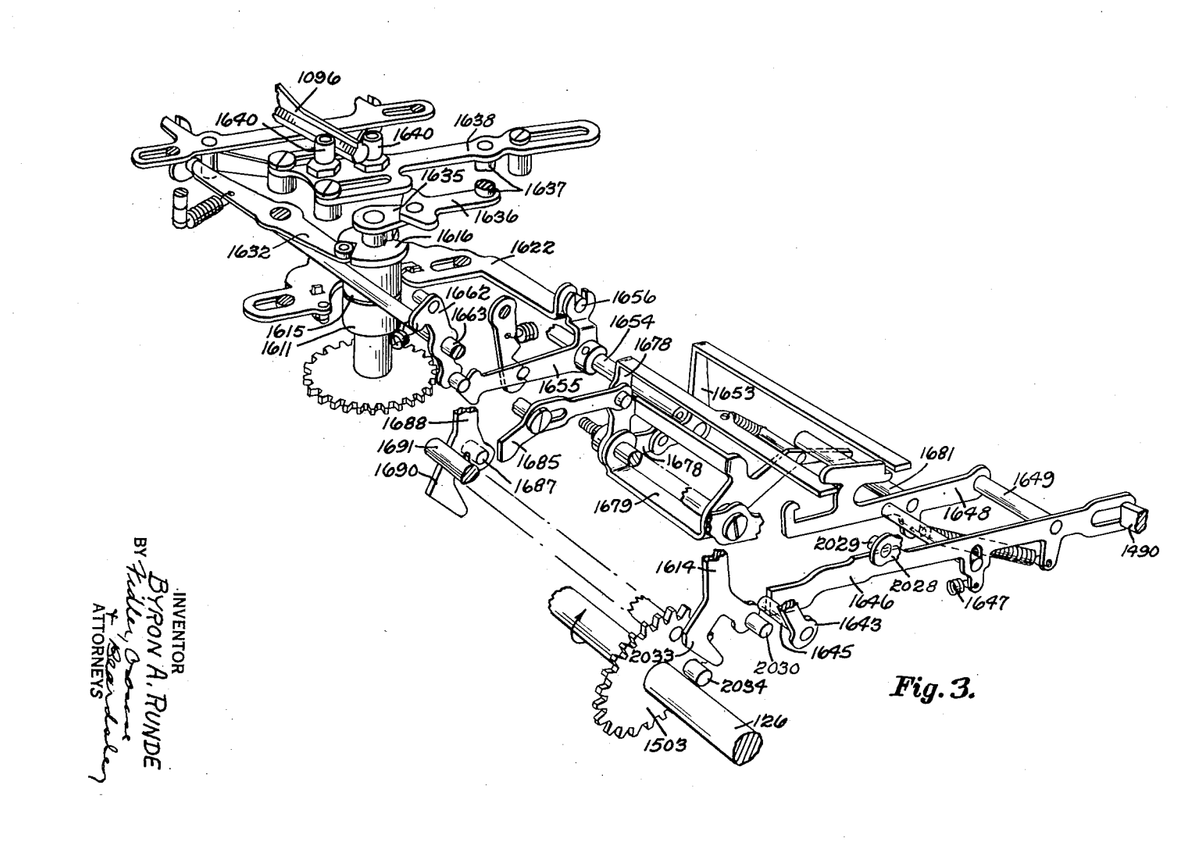
Fig. 3 is a spread perspective, as seen from forwardly, rightwardly and above, of elements of the carriage opening drive and control.
Figure 4:
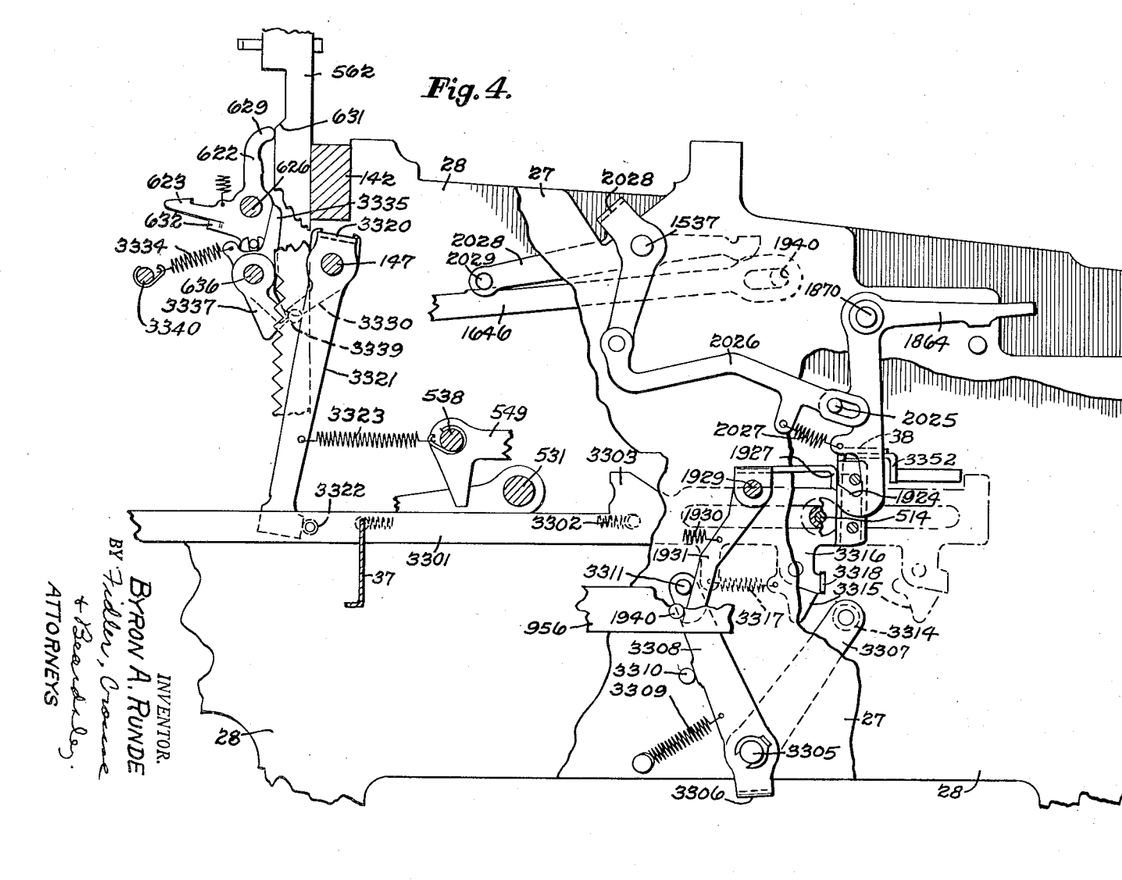
Fig. 4 is a partial right side elevation illustrating carriage opening control elements of the present invention.

Means for moving the slide 1638 to open and close the carriage and means for automatic and manual control of such opening and closing movements as above described, are shown in Figs. 3 and 4. As shown in the Butler patent, these include a clutch comprising a motor driven member 1611 which, as hereinafter briefly described, may be connected for rotation through one-half revolutions to a driven member 1615 which is connected through a crank 1635, pitman 1636 and stud 1637 to the slide 1638. As disclosed in greater detail in the Butler application, the clutch 1611, 1615 is engaged for successive half revolution movements of the driven member 1615 and crank 1635 by forward and rearward reciprocations of a control slide 1622. Such clutch controlling movements of the slide 1622 are effected both manually and automatically by portions of the mechanism shown in Fig. 3. Such mechanism comprises a link 1646 which is normally urged to its foremost position by a tension spring 1647. In successive rearward movements, the link 1646, acting through a pawl 1648 mounted thereon, alternately acts upon portions of two bell cranks 1653 and 1678 to effect alternately clockwise and counterclockwise rocking of a shaft 1654 to which is secured a crank 1655 having a slotted arm engaging a stud 1656 carried by the carriage opening and closing clutch control slide 1622. Thus successive rearward movements of the control link 1646 will cause alternate rearward and forward movements of the slide 1622 and alternate openings and closings of the carriage. As described in detail in the Butler patent, each rocking of the crank 1655 also actuates means to insure that the power supply switch (not shown) of the drive motor will be closed if it is not already closed to cause the motor to drive the clutch member 1611.

The opening and closing of the carriage may be caused manually by depression of a key 1641 (Fig. 1) which effects rearward rocking of the lower end of a lever 1643 (Fig. 3) which carries the stud 1645 located in front of the forward end of the control 1646. Thus, successive depressions of the key 1641 will cause alternate openings and closings of the paper carriage by power.

Automatic control of the opening and closing of the paper carriage is effected by the lane 14 automatic controls of the machine. As disclosed in the above mentioned Butler patent, each machine cycle in which the rise of the lane 14 sensing pin 1822 (Fig. 2) is limited by a control projection 1767 of appropriate length, the lane 14 bell crank 1864 (Fig. 4) is rocked counterclockwise and, through a spring 2027, pulls rearwardly a link 2026 which rocks counterclockwise a yoke member 2028 supported on a shaft 1537. A forwardly extending arm at the leftward side of the yoke member 2028 carries a stud 2029 which extends transversely across the upper edge of the control link 1646. The counterclockwise rocking of the yoke 2028 and lowering of the stud 2029 depresses the forward end of the control link 1646 from its normal position behind the stud 1645 to a position immediately behind a stud 2030 carried by a lower rearward branch of a lever 1614 pivotally supported at its upper end in a manner disclosed in detail in the Butler patent. A forward lower branch of the lever 1614 has a cam portion 2033 located in the path of a stud 2034 carried by a gear 1503 fastened on the main cycling shaft 126 of the machine. The parts are so arranged that near the end of each machine cycle the stud 2034 cams the lower end of the lever rearwardly so that if the forward end of the control link 1646 has been lowered into the path of the stud 2030 by the automatic lane 14 controls previously described, the link 1646 will be thrust rearwardly to effect automatic opening of the paper carriage at a time substantially after the completing operation of that machine cycle.

The gear 1503 also carries a stud 1691 which at the very beginning of each machine cycle engages a cam projection 1690 on the lower end of another lever 1688 pivotally supported at its upper end as disclosed in the Butler application. A rearward projection of the lower portion of the lever 1688 carries a stud 1687 which is thus moved rearwardly at the beginning of each machine cycle. A link 1685 pivoted at its rear end on the upper arm of a bell crank 1678 has its forward end located behind the stud 1687. When the paper carriage is in opened condition, the bell crank 1678 is in its counterclockwise position and the link 1685 is in a forward position such that, at the beginning of a machine cycle the link 1685 will be moved rearwardly by the stud 1687, thus rocking the bell crank 1678 clockwise and rocking the bell crank 1653, shaft 1654 and bell crank 1655 counterclockwise to move the clutch control slide 1622 forwardly to cause the carriage to be closed prior to operation of the printing mechanism in the machine cycle. Thus, whenever the paper carriage is open at the beginning of a machine cycle, it is automatically closed prior to the operation of the printing mechanism of that machine cycle.

When the lane 14 bell crank 1864 is rocked counterclockwise, as above described, as the lane 14 control mechanism is conditioned in the early portion of a machine cycle to cause an automatic opening of the paper carriage after the printing operation in that machine cycle, the bell crank 1864 is latched in such moved position by a latch bail 1927 which cooperates with a latching projection 1924 on the downward arm of the bell crank, as described in the Butler patent. The latch bail 1927 is yieldingly urged to latching position by a spring 1930 connected to a downward arm 1931 on the leftward side of the latch bail. Relatively late in the machine cycle, sufficiently late to insure that the functions controlled by those bell cranks, including bell crank 1864, which have been latched in effective set position by the latch bail 1927 will be performed in that machine cycle, the latch bail 1927 is moved to releasing position for engagement of the arm 1931 thereof by a stud 1940 secured in a slide 956 which, as disclosed in the Butler patent, is moved forwardly very near the beginning of each machine cycle and returned rearwardly to its normal position near the very end of each machine cycle. The parts are so arranged that the stud 1940 normally holds the latch bail 1927 in releasing position but permits the spring 1930 to urge the latch bail 1927 clockwise to latching position very shortly after the beginning of each machine cycle and again acts on the arm 1931 to return the latch bail 1927 counterclockwise to its normal releasing position close to the end of each machine cycle, to insure that the bell crank 1864 and other automatic function control bell cranks similarly cooperating with the latch bail 1927 will be free to be returned to normal at the end of each machine cycle.

*Means to disable automatic carriage opening*

The present machine is provided with means which, in certain cycle operations of the machine in which the lane 14 control would otherwise cause an automatic opening of the paper carriage after completion of the printing operation, will disable the lane 14 control mechanism and prevent it from causing such automatic opening of the paper carriage. This disabling mechanism comprises a forwardly and rearwardly movable slide 3301 which, like the differential actuator racks 511, 512 and 519, is supported on rods 514 and guided in the forward and rearward comb members 36 and 38. In the annexed drawings, only the rearward one of the rods 14 and one such comb member 38 are shown. The slide 3301 is normally urged forwardly by a tension spring 3302 secured at its forward end to another guide comb 37 and at its rearward end to a stud secured in slide 3301. The slide also has an upwardly extending shoulder 3303 which is normally held by the spring 3302 against the bail rod 531 which, as disclosed in the Butler patent, is reciprocated first forwardly and subsequently rearwardly in each machine cycle to drive the differential actuator racks 511, 512 and 519 forwardly to their differential positions prior to operation of the printing mechanism and then to return them rearwardly after the printing operation. Thus, the spring 3302 together with the bail rod 531 are capable of moving the slide 3301 forwardly prior to operation of the printing mechanism in each machine cycle and to return the slide 3301 to its normal position of Figs. 4 and 5 after the printing operation in each machine cycle, the parts being so proportioned that the return movement of the slide 3301 is effected after the printing impression is completed but substantially before the stud 2030 moves rearwardly.

The present machine is provided with an additional cross-shaft 3305 supported at its ends in side plates 27 and 28 of the machine frame and held against endwise movement by spring clips or the like engaging in grooves in the shaft adjacent the inward faces of the machine side frame plates. A yoke member 3306, rockably supported on the shaft 3305, has at its leftward and rightward ends substantially upwardly extending arms 3307 and 3308. The yoke member 3306 is held against movement endwise of the shaft 3305 by a spacing collar located between the arm 3308 and the machine frame side plate 27 and a spring clip or the like abutting against the rightward side of the arm 3308 and engaging in a groove in a shaft 3305. A tension spring 3309 connected at its rearward end to the arm 3308 and at its forward end to a stud secured in plate 27 normally maintains yoke 3306 in its normal position of Figs. 4 and 5 wherein the arm 3308 is held forwardly against a stud 3310 secured in the frame plate 27. In this position of the yoke 3306, a stud 3311 in an upward end of the arm 3308 is located immediately forwardly of the lower end of the arm 1931 of the latch 1927, and a roller stud 3314 carried on a stud in the upper end of the arm 3307 is located forwardly of and in the path of a pass-by pawl 3315 supported on a stud secured in the lower end of a downward projection 3316 on the rearward portion of the slide 3301. A tension spring 3317 connected at its rearward end to the pass-by pawl 3315 and at its forward end to a further downward projection of the slide 3301 normally holds the pass-by pawl on the clockwise position of Figs. 4 and 5 wherein a lateral lug 3318 of the pass-by pawl limits against a portion of the rearward edge of the projection 3316.

When and if the slide 3301 is permitted to move forwardly a sufficient distance (from the normal position shown in dot and dash line in Fig. 4 to the full line position of Fig. 4) as the bail rod 531 moves forwardly in the machine cycle, the spring 3317 permits the pass-by pawl to rock counterclockwise as it passes idly over the roller stud 3314. However, in the return movement of the slide 3301 from such forward position to its normal rearward position, the lug 3318 engaging the rearward edge of the projection 3316 holds the pass-by pawl 3315 in effective position such that it cams the roller 3314 and arm 3308 rearwardly thereby rocking the yoke member 3306 clockwise so that the stud 3311, acting on the arm 1931, moves the latch bail 1927 to releasing position to release the bell crank 1864 and other bell cranks which may be held in set position by the latch 1927 to permit those bell cranks to be returned to their normal positions in the manner disclosed in the Butler patent. As the lane 14 bell crank 1864 returns to clockwise to its normal position, the link 2026 is moved forwardly, the yoke member 2023 is moved clockwise, elevating the stud 2029 and permitting the control link 1646 to be returned upwardly to its normal position above the path of stud 2030 (Fig. 3) by the spring 1647. When such releasing movement of the latch 1927 is effected by the pass-by pawl 3315 carried by the slide 3301, it occurs at approximately the 238° point in the machine cycle, so that the forward end of the link 1646 is restored to its normal position above the path of the stud 2030 prior to the rearward movement of that stud, whereby automatic opening of the paper carriage is prevented from occurring in that machine cycle. Such releasing movement of the latch 1927 by the pass-by pawl 3315 occurs, however, sufficiently late so as not to interfere with or influence the performance of the functions controlled by the other automatic control bell cranks which may have been previously held in set position by the latch 1927 in that machine cycle.

*Type bar control of means to disable automatic carriage opening*

As previously indicated, the disabling of the automatic opening of the paper carriage is also controlled by certain of the type bars of the machine in accordance with the positions to which they are indexed at the time of the printing operation of the machine cycle, that is, so that the disabling of the automatic opening of the paper carriage may be made to depend upon the character of the amount printed in the machine cycle. More specifically, a means controlled by certain ones of the type bars is constructed and arranged in such manner that when those type bars are indexed to print an amount outside of a predetermined class of amounts, such type bar controlled means will limit the forward movement of the slide 3301 to such an extent that the pass-by pawl 3315 cannot pass forwardly of the stud 3314 and so, in its return stroke, cannot operate the bail 3306, arm 3308 and stud 3311, to release the latch member 1927. Consequently, if the lane 14 automatic carriage opening controls have been set for automatic carriage opening, an automatic opening of the carriage will occur in that machine cycle. Conversely, if the type bars have been indexed to print an amount within such predetermined class of amounts, the means controlled by the type bars is released so as to permit the slide 3301 to follow the bail rod 531 far enough forward in the machine cycle so that the pass-by pawl 3315 becomes effective to act upon the stud 3314 in the return stroke of the bail rod 531 to release the latch 1927 and permit the lane 14 automatic carriage opening control, if it has been set for automatic carriage opening, to return to normal sufficiently early to prevent the automatic carriage opening from occurring in that machine cycle.

As illustrated in Fig. 5, a yoke member 3320, rockably supported upon the shaft 147, has a downwardly extending right hand side arm 3321, the lower end of which is normally positioned a short distance forwardly of a stud 3322 secured in the slide 3301. A tension spring 3323 connected at its rearward end to the shaft 538 and at its forward end to the arm 3321 normally holds that arm and the yoke member 3320 in the position of Fig. 5 wherein the lower end of the arm limits against the forward side of the guide comb 37. The guide comb is notched leftwardly of the slide 3301 to a depth only sufficient to permit the stud 3322 to move forwardly past it but nevertheless to limit the clockwise movement of the arm 3321 and yoke 3320.

Figure 7:
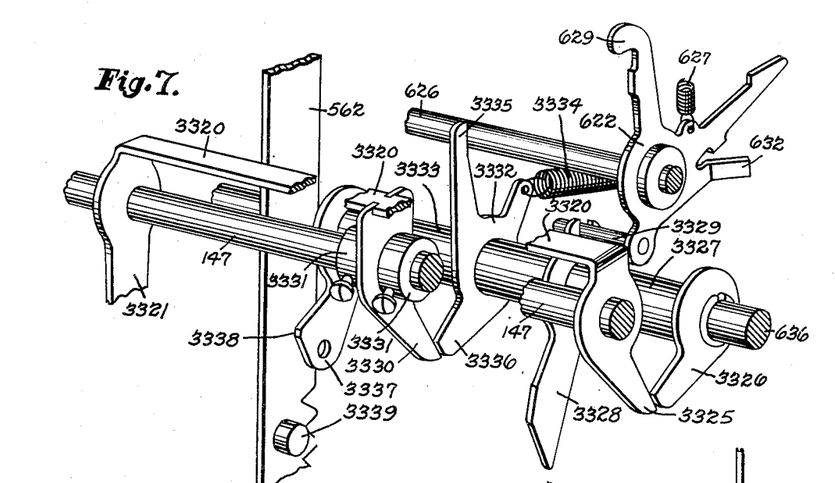
Fig. 7 is a detail spread perspective, as seen from rearwardly, leftwardly and above of some of the elements of Fig. 6.

In such normal position of the yoke 3320, a short downwardly extending side arm 3325 on the left end of the yoke is located so that its lower end is slightly behind the downward and rearward end of a short arm 3326 secured on the leftward end of a sleeve 3327 rotatable on the shaft 636 and limited against movement leftwardly on the shaft by a spring clip (Fig. 7). To the rightward end of the sleeve 3327 there is secured a pawl 3328 which is like the pawls 634 of the machine of the Butler patent which cooperate with the function symbol printing type bars and with the printing hammer latches of the dimes and pennies orders to permit the printing of ".00" totals and subtotals. The lower cam arm of the pawl 3328, however, does not cooperate with any stud on any of the type bars. It is located in a plane intermediate the dollars and dimes type bars 652 and its forked upper portion embraces a short stud 3329 extending rightwardly from and secured in an ear on the lower portion of the dollars order printing hammer latch member 622.

As disclosed in the Butler patent, the printing hammer latch members 622 of the amount orders each have upwardly extending arms 629 cooperating with the forward edges of type bars 562 so that when any amount type bar is indexed above its "0" position, cam portions 631 on the forward edges of these type bars rock the latch members 622 of the same orders counterclockwise to releasing position with respect to the printing hammers 605 of the same orders. As in the machine of the Butler patent, the latch member 622 of each order from the pennies order to the next to the highest amount printing order has a lug 632 extending forwardly and leftwardly under the forward arm of the next higher order latch member 622 so that when any latch member 622 in any amount printing order above the pennies order is rocked counterclockwise to printing hammer releasing position by the indexing of the type bar of the corresponding order above its "0" position, the latch members 622 in all lower amount printing orders are likewise rocked counterclockwise to printing hammer releasing position. As will be apparent, when the dollars order or any higher order type bar on the illustrated machine is rocked to printing hammer releasing position by the indexing of any type bar or bars 562 of the dollars or higher amount orders upwardly to a position for printing an amount of $1.00 or more, the stud 3329 on the dollars order printing hammer latch 622 will rock the pawl 3328, the sleeve 3327 and arm 3326 to position the downward, rearward end of the latter below the path of the end of arm 3325 so as not to impede clockwise rocking of the yoke member 3320.

Another arm 3330 mounted on the shaft 147 between the ends of the yoke member 3320 is held in laterally fixed position as by means of collars 3331, secured to the shaft 147 on the opposite sides of the arm 3330. Above the shaft 147, the arm 3330 is secured to the cross portion of the yoke member 3320, as by staking, so that the arm 3330 and yoke member 3320 with its side arms 3325 and 3321 can rock on the shaft 147 only as a rigid unit. A pawl 3332 is secured on a sleeve 3333 rotatable on the shaft 636 and abutting the rightward end of the sleeve 3327. A tension spring 3334 anchored at its forward end upon a rod 3340 (which replaces the bail portion 646 of the Butler patent) and connected at its rearward end to an ear on a forward upper part of the pawl 3332 normally maintains the pawl in its counterclockwise position of Figures 6 and 7 wherein the end portion of a rear upward projection 3335 on the pawl limits against the rearward side of the shaft 626 and the end of a downwardly and rearwardly extending arm 3336 of the pawl 3332 is immediately in front of the lower end of the arm 3330 to prevent counterclockwise rocking of the yoke 3320.

An arm 3337 secured on the rightward end of the sleeve 3333 and extending downwardly therefrom on the leftward side of the function symbol type bar for the front (A) crossfooter has on its rearward edge a cam formation 3338 located in the path of a stud 3339 secured in and extending leftwardly from the last mentioned type bar. The stud 3339 is so located lengthwise of the type bar in relation to the cam portion 3338 of the arm 3337 and the formation of the cam portion 3338 is such that the arm 3337, sleeve 3333 and arm 3336 are rocked clockwise each time the front crossfooter function symbol type bar moves to its total symbol printing position and are held in a position such that the lower rearward end of the arm 3336 is held below and out of the path of the lower end of the arm 3330 only while the last mentioned type bar is in its total symbol printing position.

From the foregoing, it will be apparent that clockwise movement of the yoke member 3320 and its arms 3321, 3330 and 3325 from their normal positions of Figs. 5, 6 and 7 is blocked at all times except when, in a machine cycle in which a total is taken from the front crossfooter, the amount printing type bars are indexed for the printing of a total of $1.00 or more. In the latter case, the indexing of the symbol printing type bar for the front crossfooter causes the stud 3339 to act upon the cam 3338 to remove the arm 3336 from the path of the arm 3330 and the indexing of any type bar in the dollars or higher amount printing orders above its "0" printing position, rocks the arm 3326 out of the path of the arm 3325 so that, as the spring 3302 causes the slide 3301 to follow the bail rod 531 forwardly in the machine cycle, the stud 3322 can move the arm 3321 clockwise against the tension of the spring 3323 far enough to permit slid 3301 to carry the pass-by pawl 3315 forwardly past the roller stud 3314 to enable the pass-by pawl 3315 during the return of the slide 3301 rearwardly by the bail rod 531 after the total has been printed to act upon the stud 3314 to cause the latch member 1927 to be tripped to permit the lane 14 automatic carriage opening controls to return to normal sufficiently early in the machine cycle to prevent an automatic carriage opening.

It will be apparent that the above described type bar controlled mechanism for controlling the disablement of the automatic carriage opening control may be modified in various ways so that suppression of the automatic carriage opening will be obtained when the printed amount is of a character other than a front crossfooter total equal to or greater than $1.00. For example, by either altering the position of the stud 3339 on the front crossfooter function symbol type bar or by transferring it to a suitable position on one of the B or C register function symbol type bars, the nature of the computing operation in which suppression of the automatic carriage opening is effected may be predetermined as desired. It will also be apparent that by modification of one or more of the printing hammer latches 622 and the elements 3326, 3327 and 3328, the range of printed amounts to which the amount type bars must be indexed to cause suppression of the automatic carriage opening may also be varied.

*Carriage controlled means to prevent suppression of automatic carriage opening*

For some kinds of work it may be desirable to prevent suppression of automatic carriage opening in a machine cycle when the predetermined kind of computing function is performed and the amount printed in one column of a work form is within the predetermined range, though the suppression of automatic carriage opening is desired in another machine cycle in which the same computing function is performed and an amount within the same predetermined range is printed in another column. In the present machine, such a control is provided by a means controlled by the paper carriage in accordance with the columnar position thereof. In the illustrated machine, an existing carriage control means, specifically the lane 25 carriage controlled register selecting means is utilized to provide the desired control in accordance with the columnar position of the paper carriage.

As shown in Fig. 5, the previously mentioned lane 25 carriage controlled register selecting slide 2837 has secured on its rearward end portion a stud 3345 projecting leftwardly through a forwardly and rearwardly extending slot in an irregularly shaped link 3346. The link 3346 is yieldingly urged to its foremost position relative to the slide 2837 by a tension spring 3347 connected at its rearward end to a lug on the rearward end of the link 3346 and at its forward end to the stud 3345. A second and leftwardly turned lug on the rear end portion of the link 3346 carries a stud 3348 projecting upwardly through an elongated slot in the leftwardly directed arm of a bell crank 3349. The bell crank is rockably mounted on a shoulder screw 3350 secured in a short post 3351 extending inwardly from the left side frame plate 28 of the machine below a slot through which the leftward arm of the bell crank extends. A forward arm of the bell crank 3349 has a stud and slot connection with a slide 3352 of generally L-shaped cross-section and extending transversely at the machine beneath the horizontal flange of the guide comb member 38. The slide 3352 is supported for lengthwise movement transversely in the machine by shouldered screws 3353 extending through elongated slots in the horizontal flange of the slide 3352 and threaded into the horizontal flange of the guide comb member 38.

The slide 3352 of the form illustrated in Fig. 5, while not shown in any prior patent or application, has heretofore been employed in some machines to control other devices, more specifically to control the operation of various counters. Such function is of no significance with respect to the present invention.

For the purposes of the present invention, a stud 3355 is secured in the downward, rearward flange of the slide 3352 and extends rearwardly therefrom. The stud 3355 is so positioned on the slide 3352 that when the carriage control register selecting slide 2837 is in its normal or No. 1 register selecting position, the stud 3355 is directly above the rearward portion of the slide 3301 with the rear end of the stud 3355 slightly forward of an upstanding projection 3356 on the rearward end of the slide 3351. Thus when the paper carriage is in a columnar position where the No. 1 B and C registers are selected, the stud 3355 prevents movement of the slide 3301 forwardly sufficiently to permit the pass-by pawl to act on the roller stud 3314 to suppress automatic carriage opening. However, in a machine cycle initiated with the paper carriage in a columnar position in which any other registers of the B and C register units are selected, the carriage controlled register selecting slide 2837 will be moved forwardly from its normal No. 1 register selecting position in which it is shown in Fig. 5, so that through the spring 3347 and link 3346 the bell crank 3349 will be rocked counterclockwise to shift the slide 3352 rightwardly in the machine to remove the stud 3355 from the path of the projection 3356 on the slide 3301 and to align a notch 3358 (Fig. 8) in the rear flange of the slide 3352 with the projection 3356. In that event, if the computing function being performed by the machine is of the predetermined amount and the amount being printed is within the predetermined range, the yoke member 3320 will likewise be free for clockwise movement and will permit the slide 3301 to follow the bail rod 531 forwardly sufficiently to bring about disablement of the automatic carriage opening controls in that machine cycle.

*Example of work*

Figure 9:
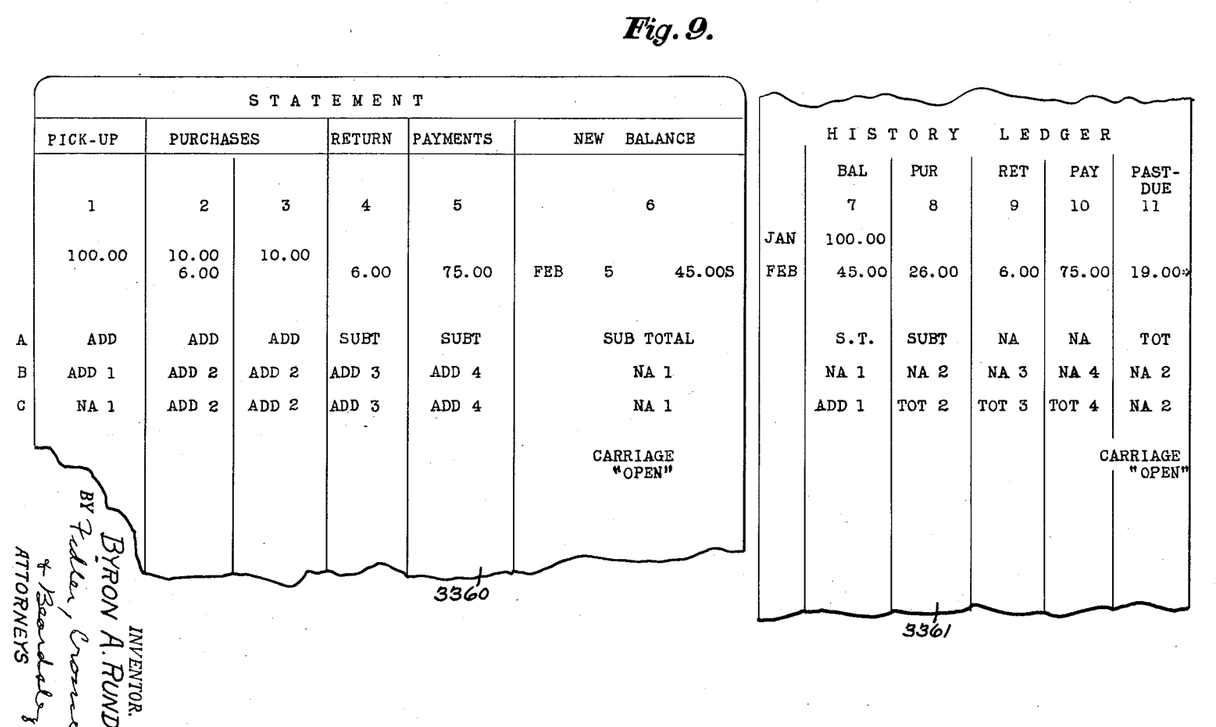
Fig. 9 illustrates a form of work which may advantageously be performed on the machine of Figs. 1 to 8.

Fig. 9 illustrates an example of one kind of work which may be performed with the machine which has been illustrated by way of example in Figs. 1 to 8.

The work forms illustrated in Fig. 9 comprise a statement form 3360 and a ledger form 3361 such as may be employed in customers' charge account cycle billing by a large department store. In the performance of such billing work, statements and ledgers for customers' large accounts may be prepared in the order of the alphabetical listing of the customers' names and on monthly dates determined, for example, by the initial letters of the customers' names so that the billing work may be carried on continuously during all the business days of each month.

In the particular example shown in Fig. 9, preparation of a customer's statement commences with the entry in the pick-up column of the statement form of the final balance from the previous month. This amount is set up on the keyboard of the machine with the paper carriage in its No. 1 columnar position, and the machine is cycled to print that amount, $100.00 in this instance in the old balance pick-up column of the statement form. The function control program unit of the machine has been provided with control projections 1676 so arranged as to cause the automatic register selection control mechanism of the machine to select in machine cycles initiated with the paper carriage in each of the several columnar positions the registers indicated by the numerals appearing in horizontal lines B and C of Fig. 1, to cause the automatic computing function controls of the machine to condition the "A" crossfooter and the selected B and C registers to perform the computing functions indicated in columns in the horizontal lines A, B and C, respectively, to cause the lane 14 carriage opening control means to be conditioned for automatic carriage opening in machine cycles performed with the paper carriage in the No. 6 and No. 11 columnar positions of the paper carriage, i. e., the statement "New Balance" and ledger "Past Due" columns, to effect the automatic carriage tabulating, a skip-tabulating and return movements and the automatic machine cycling hereinafter mentioned. The notations in Fig. 1 relating to the machine functions performed with the paper carriage in its various columnar positions, of course, do not appear on the work forms but have been added in Fig. 9 merely to facilitate a description of the example of work. It will be seen that the $100.00 old balance printed in column No. 1 is added in the crossfooter and in the No. 1 B register while the No. 1 C register is non-added.

At the end of the old balance entering the machine operation, which is initiated by manual depression of the main motor bar 291, the paper carriage tabulates to the column 2 position. Thereafter two purchase (charge) items of $10.00 and one of $6.00 are entered and printed in three successive cycles of operation of the machine, the first of which is initiated by depression of the main motor bar 291. At the end of the cycle in which the first purchase item of $10.00 is entered into the machine and printed in the No. 2 columnar position, the carriage tabulates to the No. 3 columnar position. To initiate the next cycle of operation in which the second item of $10.00 is to be printed in the No.

3 columnar position, the operator, noting that there is still a further purchase item to be entered, depresses the carriage return motor bar 294 which causes the paper carriage to be moved in the return direction to the column 2 position at the end of the machine cycle. To initiate the third purchase item entering operation in which the amount of $6.00 is to be entered into the machine and printed in the column 2 of the statement form, the operator, noting that there is no further purchase or charge item to be posted, depresses the skip motor bar 292 which causes the paper carriage at the end of the machine cycle to skip tabulate to the column 4 position. In both the second and third columnar positions, which correspond to two purchase item columns of the statement form, the amounts entered are added in the "A" crossfooter and in the No. 2 registers of both the B and C register units.

With the paper carriage in column 4 position, the operator enters a return (credit) item of $6.00 which, in a machine cycle initiated by depression of the main motor bar 291, is printed in the "Return" column of the statement form, subtracted from the "A" crossfooter and added in the No. 3 registers of both the B and C multiple register units, after which the paper carriage tabulates to its 5th columnar position. In column 5 the amount of a payment on account ($75.00) which the operator has entered on the amount keys, is printed in a machine cycle initiated by depression of the main motor bar 291 and is subtracted from the "A" crossfooter and added in the No. 4 registers of both the B and C multiple register units, after which the paper carriage tabulates to the 6th column, the "New Balance" column of the statement form where a machine cycle is automatically initiated. In this automatic machine cycle a subtotal, $45.00 in this example, is taken from the "A" crossfooter, printed in the statement "New Balance" column, and the lane 14 automatic control causes an automatic opening of the paper carriage.

The automatic carriage opening in the column 6 operation cannot, in this example, be automatically suppressed because the slide 2837 remains in its normal No. 1 register selecting position so that the stud 3355 on the slide 3352 remains in its normal position, preventing the control slide 3301 from moving forwardly sufficiently in that machine cycle to bring about suppression of the automatic carriage opening. Such carriage opening permits the operator to remove the completed statement form. As entry of the subtotal of $45.00 into the No. 1 B and C registers is not desired, the automatic register controls are non-added on these registers.

At the end of the last described automatic machine cycle, the machine carriage tabulates to its column 7 position where another machine cycle is automatically initiated. In this machine cycle the paper carriage is automatically closed, the front crossfooter again performs a subtotal-taking operation, the No. 1 B and C registers are selected, and the subtotal $45.00 is added in the No. 1 C register while the No. 1 B register is non-added and is printed in the ledger "Balance" column. At the end of this second automatic machine cycle, the paper carriage automatically tabulates to the No. 8 columnar position where a third automatic cycle is initiated. In this machine cycle, the No. 2 B and C registers are selected, a total-taking operation is performed on the No. 2 C register and the total of $26.00 representing the total of the items previously printed in the "Purchase" column of the statement form and added in the No. 2 registers is printed in the ledger "Purchase" column and subtracted from the "A" crossfooter while the No. 2 B register is non-added. At the end of this machine cycle, the paper carriage tabulates to the No. 9 columnar position where, in a 4th automatically initiated machine cycle, the No. 3 registers are selected and a total-taking operation is performed on the No. 3 C register. The amount of $6.00, which is the total of items previously printed in the "Return" column of the statement form and added in the No. 3 registers, is printed in the ledger "Return" column while both the "A" crossfooter and the No. 3 B register are non-added.

At the end of the fourth automatic machine cycle, the paper carriage tabulates to the 10th columnar position where a fifth automatic machine cycle is initiated in which the No. 4 registers are selected. A total is taken from the No. 4 C register and printed in the ledger "Payments" column. It is the total of payments previously printed in the "Payments" column of the statement form and added in the No. 4 registers. In this fifth automatic machine cycle both the "A" crossfooter and the B register are non-added. At the end of the fifth automatic machine cycle, the paper carriage automatically tabulates to its 11th and final columnar position in which a further cycle of operation of the machine is initiated automatically. In this sixth and final automatic machine cycle, a total-taking operation is performed on the "A" crossfooter. It will be seen that the total taken from the "A" crossfooter and printed in the ledger "Past Due" column, in this example $19.00, represents the balance remaining after subtraction of the $75.00 payment and the $6.00 return item from the previous month's balance of $100.00. In other words, the "A" crossfooter total represents charge items from the previous month which have not been covered by payments or returns made during the current month and in that sense represents a past due amount. Both the B and C crossfooters are non-added.

In this final automatic machine cycle, the lane 14 control is automatically conditioned to cause opening of the paper carriage after the printing of the past due total on the ledger. However, in the present example, as a total is taken from the "A" crossfooter, the "A" crossfooter function symbol type bar is indexed to its total symbol position and as, furthermore, the amount type bars are indexed to print an amount ($19.00) greater than the limiting amount, $1.00, in the illustrated embodiment of the invention, the arms 3326 and 3336 are both out of the paths of the arms 3325 and 3330 and the bail 3320 is released so as not to impede the forward movement of the control slide 3301. Also, the register selecting register controls in this machine cycle have been arranged to select the No. 2 B and C registers so that in the automatic machine cycle initiated in the 11th columnar position of the paper carriage, the slide 2837 is moved forwardly from its No. 1 register selecting position and the slide 3352 is moved rightwardly in the machine to displace the stud 3355 from the path of the lug 3356 on the rear end of the control slide 3301. Consequently, in that machine cycle in the example just described, the slide 3301 follows the bail 531 forwardly far enough to carry the pass-by pawl 3315 forwardly past the roller stud 3314 so that during the return of the bail rod 531 and the slide 3301 after completion of the printing operation, the pass-by pawl 3315 will rock the yoke member 3306 to trip the latch 1927 and suppress the automatic carriage opening by permitting return of the lane 14 controls to normal position prior to rearward movement of the stud 2030 of Fig. 3.

Statements and ledgers for other customers are successively prepared in like manner. It will be apparent that whenever the "A" crossfooter total printed in the ledger past due column (column 11) is less than $1.00, the arm 3326 will remain in its normal position to block clockwise rocking of the yoke member 3320 so that the arm 3321 will prevent the control slide 3301 from moving rearwardly sufficiently to suppress automatic carriage opening. Consequently the carriage will open automatically at the end of the final operation in the preparation of the statement and ledger for each customer if the past due amount printed in the past due column of the ledger form is less than $1.00, but in each instance in which the past due amount is $1.00 or more, the lane 14 controlled automatic carriage opening will be suppressed so that the operator, in order to open the carriage to permit insertion of the next statement form, will have to depress the carriage opening key 1641. Thus, the operator's attention will forcibly be called to the fact that the past due amount is such as to require special handling of the just completed statement form, i. e., the attachment of a suitable form of past due notice or reminder. The operator may, therefore, perform the work without giving any attention to the past due amounts except when the machine, by reason of the provisions of the present invention embodied therein, commands the operator's attention by suppressing the automatic opening of the carriage and thereby requires the operator to open the carriage before insertion of the next customer's statement form.

In the previously described example of work an automatic lane 14 controlled carriage opening occurred at the end of the machine cycle automatically initiated when the carriage tabulated to its 6th columnar position, and a crossfooter subtotal was printed in the "New Balance" column of the statement form, thus completing the statement form and permitting it to be removed from the machine. At that time the paper carriage remained open only for a short time inasmuch as the carriage automatically tabulated to the next columnar position and a second automatically initiated cycle of operation of the machine was performed to again print the crossfooter subtotal in the balance column of the ledger form. It is not intended to let the operator insert a new statement form for the next customer to be billed during that column 6 opening of the paper carriage. In fact, such opening of the paper carriage after printing of the "New Balance" on the statement form is not necessary, though it serves to illustrate the automatic (lane 25) columnar control of the means for suppressing the lane 14 automatically controlled carriage opening. The lane 14 automatically controlled carriage opening in the statement "New Balance" printing operation may be omitted by merely omitting the control projection 1767 from the column 6 position in lane 14 in the above example.

From the foregoing description and the annexed drawings, it will be readily apparent to those skilled in the art that machines embodying the present invention may advantageously be employed in the performance of many varieties of accounting or computing work in which it is desirable to direct the special attention of the operator to an amount printed in certain cycles of operation of the machine when such an amount is of a predetermined character.

I claim:

1. An accounting machine having means to drive it through cycles of operation, record supporting means including elements movable from record sheet holding position to record sheet inserting position and reversely, printing mechanism including indexable type carriers and means operable from said drive means in a machine cycle to effect printing impression from said type carriers upon a record sheet held in said record supporting means, means operable by said drive means in the machine cycle to shift said movable elements from holding position to inserting position after printing, and means controlled by at least one of said type carriers to control said shifting means.

2. An accounting machine having means to drive it through a cycle of operation, printing mechanism including a series of indexable type carriers and means operable from said drive means in machine cycles to effect printing impressions from said type carriers, means to advance said type carriers in a machine cycle from normal positions to indexed positions prior to said printing operation and to return them to said normal positions subsequently to said printing operation, a platen mounted for movement from a printing position where it supports a record sheet to receive printing impressions from indexed type carriers during said printing operation to a retracted position for facilitating insertion of record sheets, and reversely, platen-moving means operable from said drive means in said machine cycle to move said platen from printing position to retracted position after said printing operation, and means controlled by type carriers of said series to control said platen moving means.

3. An accounting machine having means to drive it through cycles of operation, printing mechanism including indexable type carriers and means driven from said drive means in machine cycles to effect printing impressions from said type carriers, a paper carriage movable to any of a plurality of columnar positions, record sheet receiving and holding means on said carriage and including elements mounted for movement from a closed-throat position for holding record sheets to receive printing impressions from indexed type carriers to an open-throat position for facilitating insertion of record sheets, and reversely, means operable from said drive means in a machine cycle to move said movable elements from closed-throat position to open-throat position after printing operation of said driven means, means controlled by said carriage in accordance with the columnar positioning thereof, and means controlled jointly by said carriage-controlled means and by at least one of said type carriers to cause said operable means to be operated to move said movable elements from closed-throat position to open-throat position.

4. An accounting machine having means to drive it through cycles of operation, printing mechanism including indexable type carriers and means operable from said drive means in machine cycles to effect printing impressions from said type carriers, a record carriage movable to any of a plurality of columnar positions, a platen mounted on said carriage for movement relative thereto from a printing position where it supports record sheets to receive printing impressions from indexed type carriers to a retracted position for facilitating insertion of record sheets, and reversely, a platen-moving means operable from said drive means in a machine cycle to move said platen from printing position to retracted position after operation of said printing impression means, means controlled by said carriage in accordance with the columnar positioning thereof, and means controlled jointly by said carriage-controlled means and by at least one of said type carriers to cause said platen moving means to be operated to move said platen to retracted position.

5. An accounting machine having means to drive it through cycles of operation, record supporting means including elements movable from record sheet holding position to record sheet inserting position and reversely, printing mechanism including indexable type carriers and means operable from said drive means in a machine cycle to effect printing impression from said type carriers upon a record sheet held in said record supporting means, means operable by said drive means in a machine cycle to move said movable elements from holding position to inserting position, means controlled by at least one of said type carriers, means controlled by said carriage in accordance with the positions thereof to enable and disable said type carrier controlled means, further means controlled by said carriage in accordance with the positions thereof, and means controlled by said type-carrier controlled means when the latter is enabled and by said further carriage controlled means to control operation of said moving means by said drive means.

6. An accounting machine having means to drive it through cycles of operation, settable amount entering means, computing means, amount differential means driven by said drive means in a machine cycle and cooperable with said amount entering means and with said computing means, function control means for said computing means conditionable to cause any of a plurality of kinds of computing functions to be performed upon said computing means, printing mechanism including a plurality of amount type carries indexable by said amount differential mechanism and means driven from said drive means in a machine cycle to effect printing impressions from said amount type carriers, a carriage movable to any of a plurality of columnar positions, record sheet receiving and holding means on said carriage and including means movable from a closed-throat position where it holds record sheets to receive printing impressions from indexed type carriers to an open-throat position for facilitating insertion of record sheets, and reversely, means operable from said drive means in a machine cycle to move said movable means from closed-throat position to open-throat position after operation of said printing impression means, a first means controlled by said carriage in accordance with the columnar positioning thereof, a second means controlled by said function control means in accordance with the functions for which the latter is conditioned, and means controlled jointly by said first means, said second means and at least one of said amount type carriers in accordance with the position to which it is indexed to cause said operable means to be operated to move said movable means to open-throat position.

7. An accounting machine having means to drive it through cycles of operation, settable amount entering means, computing means, amount differential means driven from said drive means in a machine cycle and cooperable with said amount entering means and with said computing means, function control means for said computing means conditionable to cause any of a plurality of kinds of computing functions to be performed upon said computing means, printing mechanism including a plurality of amount type carriers indexable by said amount differential mechanism, a function symbol type carrier indexable under control of said function control means, and means driven from said drive means in a machine cycle to effect printing impressions from said amount and symbol type carriers, a carriage movable to any of a plurality of columnar positions, record sheet receiving and holding means on said carriage and including means movable from a closed-throat position where it holds record sheets to receive printing impressions from indexed type carriers to an open-throat position for facilitating insertion of record sheets, and reversely, means operable from said drive means in a machine cycle to move said movable means from closed-throat position to open-throat position after operation of said printing impression means, a first means controlled by said carriage in accordance with the columnar positioning thereof, and means controlled jointly by said first means, by said function symbol type carrier and by at least one of said amount type carriers in accordance with the positions to which they are indexed to cause said operable means to be operated to move said movable means to open-throat position.

8. An accounting machine having means to drive it through cycles of operation, record supporting means including elements movable from record sheet holding position to record sheet inserting position and reversely, printing mechanism including indexable type carriers and means operable from said drive means in a machine cycle to effect printing impression from said type carriers upon a record sheet held in said record supporting means, means to move said movable elements from holding position to inserting position, normally ineffective means operable to an effective condition to render said moving means operable by said drive means after operation of said impression means, means operable prior to operation of said impression means to operate said normally ineffective means to effective condition, means to retain said normally ineffective means in effective condition until said moving means is operated and means controlled by at least one of said type carriers to operate said retaining means to release said normally ineffective means for return to normal.

9. An accounting machine having means to drive it through cycles of operation, a traveling record carriage movable to any of a plurality of columnar recording positions, record sheet supporting means on said carriage including elements movable from record sheet holding position to record sheet receiving position and reversely, printing mechanism including indexable type carriers and means operable from said drive means in a machine cycle to effect printing impression from indexed type carriers upon a record sheet held by said supporting means, normally ineffective means to move said movable elements, a means controlled by said carriage in accordance with the positions thereof, normally ineffective means conditionable by said carriage controlled means prior to operation of said printing impression means to a condition effective to render said moving means operable by said drive means after operation of said printing impression means to move said movable elements to record sheet inserting position, means to releasably hold said conditionable means in effective condition, and means controlled by at least one of said type carriers to disable said retaining means and release said conditionable means for return to ineffective position.

10. An accounting machine having means to drive it through cycles of operation, a traveling record carriage movable to any of a plurality of columnar recording positions, record sheet supporting means on said carriage including elements movable from record sheet holding position to record sheet receiving position and reversely, printing mechanism including indexable type carriers and means operable from said drive means in a machine cycle to effect printing impression from indexed type carriers upon a record sheet held by said supporting means, normally ineffective means to move said movable elements, a means controlled by said carriage in accordance with the positions thereof, normally ineffective means conditionable by said carriage-controlled means prior to operation of said printing impression means to a condition effective to render said moving means operable by said drive means after operation of said printing impression means to move said movable elements to record sheet inserting position, means to releasably hold said conditionable means in effective condition, further means controlled by said carriage in accordance with the positions thereof, and means enabled by said further carriage-controlled means and controlled by at least one of said type carriers to disable said retaining means and release said conditionable means for return to ineffective position.

11. An accounting machine having means to drive it through cycles of operation, a traveling record carriage movable to any of a plurality of columnar recording positions, record sheet supporting means on said carriage including elements movable from record sheet holding position to record sheet receiving position and reversely, printing mechanism including indexable type carriers and means operable from said drive means in a machine cycle to effect printing impression from indexed type carriers upon a record sheet held by said supporting means, normally ineffective means to move said movable elements, a means controlled by said carriage in accordance with the positions thereof, normally ineffective means conditionable by said carriage controlled means prior to operation of said printing impression means to a condition effective to render said moving means operable by said drive means after operation of said printing impression means to move said movable elements to record sheet inserting position, means to releasably hold said conditionable means in effective condition, means controlled by at least one of said type carriers to disable, said retaining means and release said conditionable means for return to ineffective position, means normally disabling said type carrier controlled means, a further means controlled by said carriage in accordance with the positions thereof, and means controlled by said further carriage controlled means to disable the last-mentioned disabling means.

12. A cyclically operable accounting machine having record supporting means including an element movable from record sheet holding position to record sheet inserting position and reversely, printing mechanism including indexable type carriers and means operable in a machine cycle to effect printing impression from said type carriers upon a record sheet held in said record supporting means, means to shift said movable element from holding position to inserting position, a power drive means, means to enable said drive means to operate said shifting means after said printing operation in a machine cycle, and means controlled by at least one of said type carriers to control said shifting means.

13. A cyclically operable accounting machine having printing mechanism including indexable type carriers and means to effect printing impressions from said type carriers, a paper carriage movable to any of a plurality of columnar positions, record sheet receiving and holding means on said carriage and including an element mounted for movement from a closed-throat position for holding record sheets to receive printing impressions from indexed type carriers to an open-throat position for facilitating insertion of record sheets, and reversely, means to move said movable element from closed-throat position to open-throat position after printing operation of said impression means, means controlled by said carriage in accordance with the columnar positioning thereof, a power drive means, means to enable said drive means to operate said moving means after operation of said impression means in a machine cycle, and means controlled jointly by said carriage-controlled means and by at least one of said type carriers to control said enabling means.

14. A cyclically operable accounting machine having settable amount entering means, computing means, amount differential means cooperable with said amount entering means and with said computing means, function control means for said computing means conditionable to cause any of a plurality of kinds of computing functions to be performed upon said computing means, printing mechanism including a plurality of amount type carriers indexable by said amount differential mechanism and means to effect printing impressions from said amount type carriers, a carriage movable to any of a plurality of columnar positions, record sheet receiving and holding means on said carriage and including means movable from a closed-throat position where it holds record sheets to receive printing impressions from indexed type carriers to an open-throat position for facilitating insertion of record sheets, and reversely, means to move said movable means from closed-throat position to open-throat position after operation of said printing impression means, a power drive means, means to enable said drive means to operate said moving means after operation of said impression means in a machine cycle, a first means controlled by said carriage in accordance with the columnar positioning thereof, a second means controlled by said function control means in accordance with the functions for which the latter is conditioned, and means controlled jointly by said first means, said second means and at least one of said amount type carriers to control said enabling means.

References Cited in the file of this patent

UNITED STATES PATENTS

| | | |
|---|---|---|
| 2,441,870 | Christian | May 18, 1948 |
| 2,629,549 | Butler | Feb. 24, 1953 |